United States Patent Office 2,745,803
Patented May 15, 1956

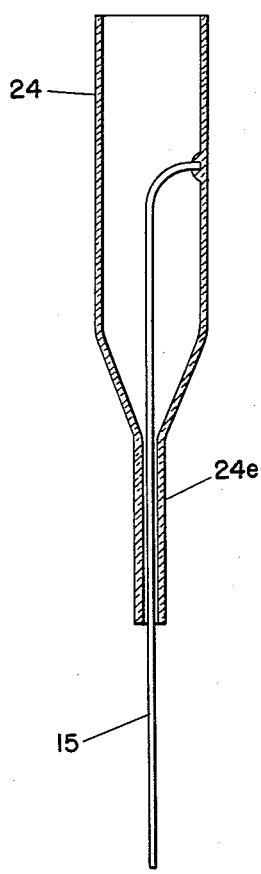
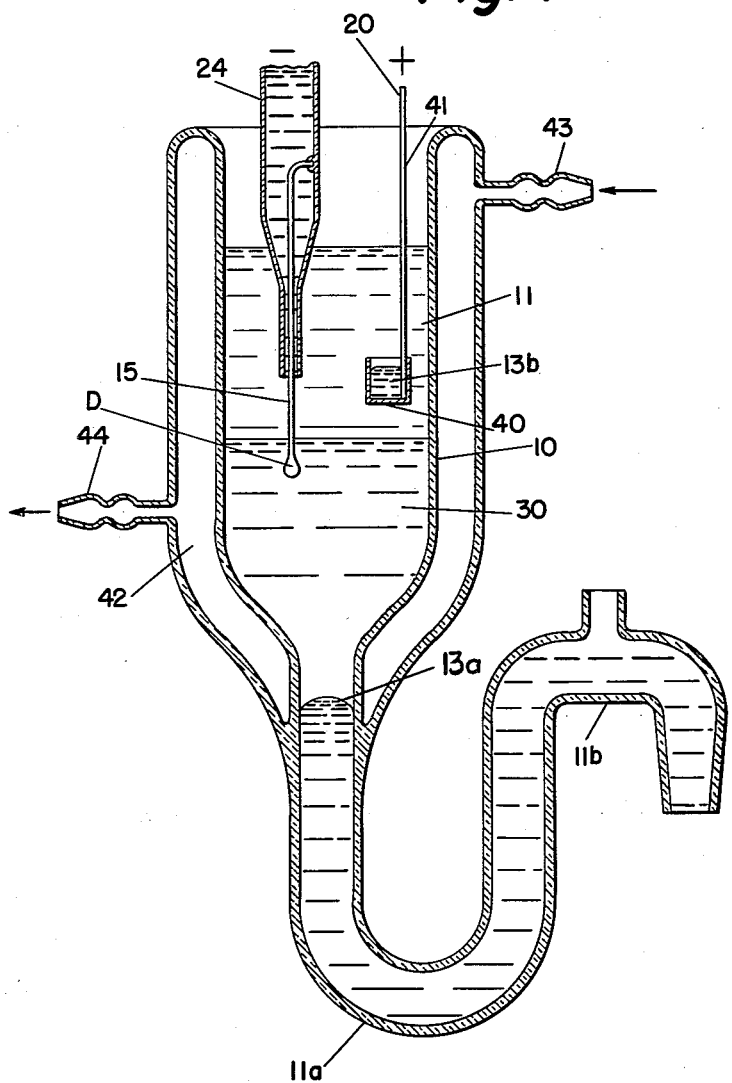

2,745,803

POLAROGRAPHIC ELECTRODE

Pierre Lévêque, Fontenay aux Roses, France, assignor to Leeds and Northrup Company, Philadelphia, Pa., a corporation of Pennsylvania Application April 24, 1952, Serial No. 284,027

Claims priority, application France May 10, 1951

6 Claims. (Cl. 204—195)

The present invention is particularly applicable to systems for chemical analyses of the type in which valuable information may be secured by determining the relationship between the voltage applied to and the current flow through a solution and has for an object the provision of means of greatly increasing the sensitivity of the system.

It is well known that in polarographic analysis one electrode (the cathode or anode) of the system comprises drops of mercury issuing from a capillary tube and that useful information is obtained from curves illustrative of the current-voltage relationship during a run. Where dropping-mercury electrodes are utilized, the electrode surface varies between a maximum value corresponding with the maximum size of the drop of mercury attainable to a minimum value corresponding to the diameter of the capillary tube at the time when the drop of mercury has detached itself from its capillary source of supply. The mercury drops may be detached at intervals of two seconds. In order to eliminate the variations due solely to the slow increase in area and the rapid decrease in area of the mercury electrode, the measuring apparatus must be highly damped to minimize the changes in current due solely to such changes in area. Since the measuring instrument must be highly damped, there is imposed a limitation on the speed with which it can respond and, hence, the measuring operation as a whole must be relatively slow.

In accordance with the present invention, there is provided an electrode with a constantly renewed surface presenting a substantially constant area to the solution under measurement with avoidance of the limitations of the dropping-mercury electrode discussed above and also of much greater area than has been possible with the dropping type of electrode. In accordance with the present invention, measurements may be made under conditions of greater sensitivity than those possible with the dropping-mercury type of electrode and with measuring times for a run decreased.

In carrying out the invention in one form, there is provided a metallic element having a surface capable of being wetted by the liquid and forming the surface area of the electrode, together with a flow controller such as may be provided by an opening between the walls of the container for the liquid and the metallic element of a size which regulates the flow of liquid along the wettable surface to provide a constant effective area of the liquid along and around the element. In a preferred form of the invention, the liquid is mercury and the metallic element is amalgamated with mercury. The element may be of platinum, or an alloy, suitably treated so that it is capable of being amalgamated and, hence, provides a wettable surface along which mercury will flow without formation along the wire of drops or other changes in area. The length of the element is sufficiently great that the area thereof presented to the solution under test is large compared with small drops of mercury formed at the end thereof.

For further objects and advantages of the present invention, reference is to be had to the following detailed description taken in conjunction with the accompanying drawings, in which:

Fig. 3 is a sectional view of a modification of the invention; and

Fig. 4 is a sectional view of a further modification of the invention.

Figure 1:
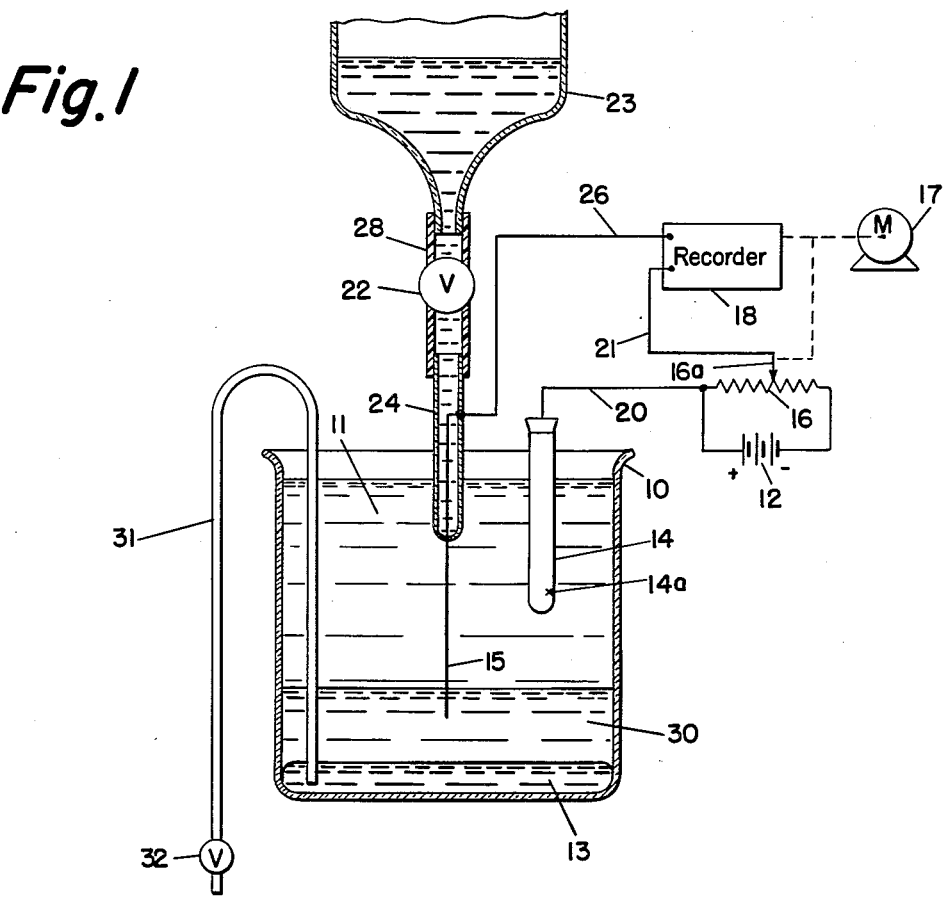
Fig. 1 is a schematic representation of a polarographic system to which the invention has been applied.

Referring to the drawings, the invention in one form has been shown as applied to a polarographic system having a vessel 10 in which there is placed a conductive solution or electrolyte 11 which is to be examined. While one connection to the positive pole of a suitable source of direct current, shown as a battery 12, may be made directly to a pool of mercury 13 in the bottom of container 10 (in the absence of layer 30), the arrangement of Fig. 1 illustrates that connection as being made to solution 11 through a calomel reference electrode 14 associated with a salt bridge tube. This electrode may be of the type shown in Perley Patent 2,345,498 with a tiny opening 14a providing an electrical connection to solution 11. A resistance wire 16 is connected across the two poles of the direct-current source of supply 12 with a sliding contact 16a driven along the resistance wire in any suitable manner as by a motor 17 which may form a part of a recorder 18, such for example, as the motor driving the chart thereof. If desired, separate synchronous motors may be used to drive contact 16a and the chart of instrument 18. The instrument 18 is provided with conventional means for the measurement of current flowing through conductors 20 and 26 which complete the connections to the electrodes 14 and 15 in the solution or electrolyte upon which the polarographic analysis is to be made.

Figure 2:
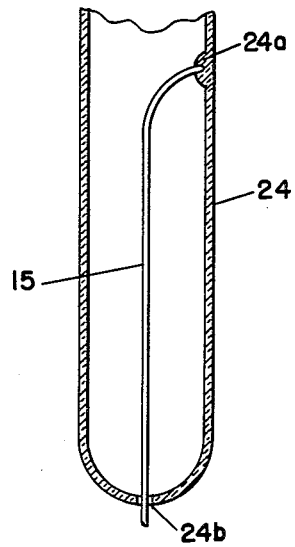
Fig. 2 is an enlarged sectional view of an electrode made in accordance with the present invention and slightly differing from the one shown in Fig. 1.

When an analysis is to be made, a valve 22 is opened to allow mercury to flow from a reservoir or container 23 into a tube 24 from which there downwardly extends the metallic element 15. As best shown in Fig. 2, there is a small opening, shown as annular, at the lower end thereof for passage of mercury along and in contact with the element 15. The surface of element 15 is wettable by the mercury and, hence, the mercury forms a constant and reproducible thickness around, about and along the element 15 to present in the electrolyte or solution 11 a constant effective area for flow of current from electrode 15 through the solution to electrode 14. The flow area formed by the opening at the lower end of tube 24 is preferably such that at the lower end of element 15 small drops of mercury form and detach themselves therefrom at the rate of about twenty or thirty per minute.

During the analysis, contact 16a is moved from left to right, as viewed in Fig. 1, to increase the voltage applied to electrodes 14a, 15 as the recorder chart is moved in synchronism therewith. The resulting changes in current vary the position of the recorder pen transversely of the chart movement. The voltages, at which the current abruptly changes from one limiting level to another limiting level in the recorded voltage/current curve, each identifies a particular substance in the solution and the changes in current level at such voltage is a measure of the concentration of that substance. Such curves and the theory involved are discussed in United States Patent No. 2,267,551 to Robert H. Cherry. Since there will be different limiting current levels, depending upon the nature and concentration of the substances present in the unkown solution, it will be seen that if there be superimposed upon such changes in current levels further oscillatory changes due to the change in area of an electrode between maximum and minimum values, the results will be more difficult to interpret or the measuring system must be slowed down by high damping to eliminate such oscillations insofar as the measuring apparatus or recorder 18 is concerned.

In accordance with the present invention, the variation between a substantially zero area of an electrode and a maximum value is eliminated by providing the elongated, constant, effective area of mercury extending from the end of container 24 downwardly through the solution, that area being great as compared with the small drops D (Fig. 4) leaving the end of the element 15.

Further in accordance with the present invention, the area may be increased and constantly renewed and, thus, the sensitivity of the apparatus can be greatly increased and in some cases has been increased forty times more than that previously attained with the usual dropping-mercury electrode.

While other structures may be utilized, in Fig. 2 I have shown the metallic element 15 secured by a glass bead 24a formed integrally with a side wall of tube 24. For example, as shown in Fig. 1, the element 15 may be secured to a metallic button sealed in the glass wall 24 and used to complete the electrical circuit by way of conductor 26 from element 15 to the recorder 18. In the arrangement of Fig. 2, the electrical connection to element 15 may be made directly to the mercury either in vessel 23 or in tube 24, as may be desired. An annular opening is provided around element 15, this opening being shown greatly enlarged in Fig. 2. If the element 15 were free of side wall 24 and glass bead 24a, the opening 24b would be adequate if a gentle friction were experienced in moving the element or wire 15 lengthwise of tube 24. Thus, it will be seen that the area for flow of mercury as formed by opening 24b is of capillary dimensions and only of a size (length and diameter) which permits the mercury constantly to renew, and at low rate, the mercurial surface of element 15. A mercurial surface is provided around, about and lengthwise of the extended end of element 15 by reason of the fact that it is capable of being wetted by the mercury. Specifically, element 15 is amalgamated with mercury before being placed in operation. The wire or element 15 is of a suitable metal which will amalgamate with mercury. It may be platinum, an alloy thereof, or palladium having an amalgam surface. It may be amalgamated in manner well understood by those skilled in the art. For example, after a preliminary degreasing operation, it may be heated to redness in an alcohol flame. It is then immersed in mercury brought to the boiling point and withdrawn only after cooling of the mercury to room temperature. The platinum element or wire is then treated with a 0.1% amalgam of sodium for two minutes, and is then immersed in distilled water until there is no further evolution of gas.

During the time when the electrode is not in use, it must be kept immersed in mercury to avoid deamalgamation and/or oxidation of its surface. Accordingly, when a substantial time interval occurs between successive runs, it will be desirable to remove the tube or container 24 and place the same in a storage vessel filled with mercury to a level adequate to maintain the extending end of element or wire 15 fully immersed. The easy removal of tube 24 and element 15 is conveniently accomplished by the provision of a flexible tube 28 of suitable plastic material into one end of which the container 24 extends. Clamping devices (not shown) for tube 28 may be used if desired.

The valve 22 may be in the form of a pinch cock or other suitable type of valve as may be desired. The amalgamation of the wire results in a continuous flow of mercury on and over and about the wire 15 for the presentation to the solution of a mercurial surface of substantially constant effective area and which never approaches a zero surface area as in the case of an electrode whose surface is formed entirely of a drop of mercury which periodically separates itself from the capillary source of supply and greatly changes the resistance of the measuring circuit.

Because of the extended surface external to tube 24 provided by the wire or element 15, which may be of the order of many times that of a single mercury drop of the type heretofore used, it will be understood that small drops of mercury detaching themselves from the lower end of wire 15 are quite small in area compared with the total effective area of the element 15. Due to the increased mercurial area in solution 11, not only is the effect of the change in area due to the formation and fall of a drop of mercury greatly reduced, but also the sensitivity of the apparatus as a whole is greatly increased. For example, with an electrode of platinum with an amalgam surface of a diameter of 0.4 millimeter, a length of 7 mm. and a flow rate of mercury corresponding with dropping intervals of 0.6 second, the sensitivity achieved is forty times greater than with the ordinary dropping-mercury electrode with its usual dropping interval of approximately two seconds.

Where it is desired completely to suppress the oscillations due to the drops of mercury formed at the end of the wire or element 15, a body of insulating liquid 30 may be provided in vessel 10. The level of the insulating liquid 30 may be just above the lower end of the wire 15. Thus, the effective area of the electrode 15 will be from the interface between the insulating liquid 30 and that of the solution 11 to the lower end of vessel 24. As the mercury descends into the insulating liquid 30 of higher specific gravity than the solution under test, and which may be of tetrachloroethane or dibutyl-phthalate, the effective area of the electrode will be unchanged and unaffected by the droplets forming in the insulating layer 30. Where the run is to be of substantial length, a syphon or other device may be provided continuously to remove mercury which collects in vessel 10 at the same rate as it is added from container 24, thus assuring a constant level of the insulating liquid 30 and a constant length and effective area of the electrode 15. As shown, a syphon 31 is provided with a valve 32 which may be manually operated to maintain the level as in manner previously described. The valve 32 may be operated automatically if desired.

Now that the principles of the invention have been fully set forth, it will be understood many modifications may be made therein, all within the scope of the appended claims. For example, instead of the enlarged opening in tube 24 as shown in Fig. 2, that tube, as illustrated in Fig. 3, may terminate in an elongated end 24e having an opening of substantial length and of slightly greater diameter than that of the amalgamated element 15. The length of the capillary section 24e need be only of the order of 15 mm. with an inside diameter of 0.54 mm., while the element 15 may have a diameter of 0.50 mm. The length from the lower end of the capillary section 24e is not critical, and a suitable length may be of from 8 to 25 mm., though lengths less and greater than the indicated range can also be used.

Where alloys of platinum are utilized for element 15, such for example, as the platinum-palladium alloys, it is important that that part of element 15 which is disposed interiorly of the capillary section 24e be made of pure platinum. By providing the capillary section of element 15 of pure platinum, there is avoided variations of volume which have been found to occur on amalgamation of platinum-palladium alloys. Any variations in volume of wire 15 within capillary section 24e will, of course, influence the rate of flow of the mercury along element 15.

As a further modification of the invention, reference may be had to Fig. 4 in which the insulating layer 30 may be ethylphthalate with a solution 11 under test above it in a vessel 10 of somewhat different configuration from the one shown in Fig. 1. For example, vessel 10 terminates in a tube or outlet passage 11a having a reversed bend 11b forming an outlet passage which functions automatically to maintain constant the level 13a of mercury within vessel 10. This arrangement may be preferred over the syphon 31 disclosed in Fig. 1. In Fig. 4 the one electrode comprises the element 15, while the other electrode is formed by a pool of mercury 13b within a suitable vessel 40, to which mercury electrical connection is made as by a conductor 41 which joins with conductor 20 of the measuring system of Fig. 1. The conductor 41 is insulated and may be attached to vessel 40 to support it within the solution 11, its point of exit from the insulation occuring beneath the level of mercury 13b. The electrode formed by mercury 13b will sometimes be preferred over the salt-bridge arrangement of Fig. 1, particularly where the electrolytic current exceeds 10 microamperes.

In either the arrangement of Fig. 1 or the arrangement of Fig. 4, if the element 15 be made relatively long, it will be seen that its effective length may be readily changed by varying the extent of its immersion within the insulating layer 30. While the simple raising or lowering of the assembly including element 15 will change the effective length of element 15 exposed to the solution under measurement, it will be seen that the level of the insulating layer 30 may be readily changed by adding or withdrawing insulating liquid from vessel 10, or by raising or lowering the reversed bend 11b which establishes the level of mercury maintained within vessel 10.

As further illustrated in Fig. 4, the vessel 10 as a whole may be enclosed in a double-walled vessel 42 through which a temperature-regulating medium may flow, as by way of an inlet connection 43 and an outlet connection 44, to hold chamber 10 and its contents at a predetermined temperature. The flow of the cooling medium may be regulated by any suitable means and under the control of a thermostat, if desired.

What is claimed is:

1. Polarographic apparatus comprising a container for a solution under test, and elongated metallic element having a surface wettable by mercury for flow of mercury along that surface, supporting means for positioning said element within said container with the lower end of said element disposed near and spaced from the bottom of said container, said supporting means including walls closely surrounding said element and forming a flow passage about the upper end of said elongated element, means for supplying mercury to said passage, the size of the area of said passage between said element and said walls restricting flow of mercury along said wettable surface to such a low rate that only discrete drops of mercury form at, and detach themselves from, the lower end of said element, the length of said element through the solution under test providing a mercurial surface several times greater than that of the area of the succesive drops of mercury which detach themselves from the lower end of said element.

2. The combination set forth in claim 1 in which said metallic element is made of a platinum-palladium alloy.

3. The combination set forth in claim 1 in which the spacing between said element and said walls is so small that gente friction is produced on said element by the surface of said walls upon relative movement between them.

4. The combination set forth in claim 1 in which said flow passage comprises a capillary tube through which said metallic element extends, said element within said capillary tube being made of substantially pure platinum and throughout the length thereof outside of said capillary tube being made of a platinum-palladium alloy, the volume of which increases with amalgamation thereof.

5. Polarographic apparatus comprising a container for a solution under test, an elongated metallic element having a surface wettable by mercury for flow of mercury along that surface, supporting means for positioning said element within said container with the lower end of said element spaced from but disposed adjacent the bottom of said container, said supporting means including walls forming a flow passage about the upper end of said element, means for supplying mercury to said passage, the size of the area of said passage between said element and said walls restricting flow of mercury along said wettable surface to such a low rate that only discrete drops of mercury form at, and detach themselves from the lower end of said element, and means for establishing a bottom level of the solution under test above the lower end of said element comprising a body of insulating liquid of specific gravity greater than the solution under test the upper level of which is above said lower end of said element for separation of said drops of mercury below the solution under test and within said insulating liquid.

6. Polarographic apparatus comprising a container for a solution under test, an elongated metallic element having a surface wettable by mercury for flow of mercury along that surface, supporting means for positioning said element within said container with the lower end of said element disposed above and in spaced relation from the bottom of said container, said supporting means including walls forming a flow passage about the upper end of said element, means for supplying mercury to said passage, the size of the area of said passage between said element and said walls restricting flow of mercury along said wettable surface to such a low rate that only discrete drops of mercury form at, and detach themselves from the lower end of said element, said container having a lower level of insulating liquid located above said lower end of said element for separation of said drops of mercury below the solution under test, and means for maintaining constant the level of mercury at the bottom of the container produced by accumulation of the mercurial drops therein.

References Cited in the file of this patent

UNITED STATES PATENTS 2,598,228    Cox _____ May 27, 1952

FOREIGN PATENTS 723,185    Germany _____ July 31, 1942